(No Model.)
F. A. SOWLE.
SEINE.
No. 371,987. Patented Oct. 25, 1887.
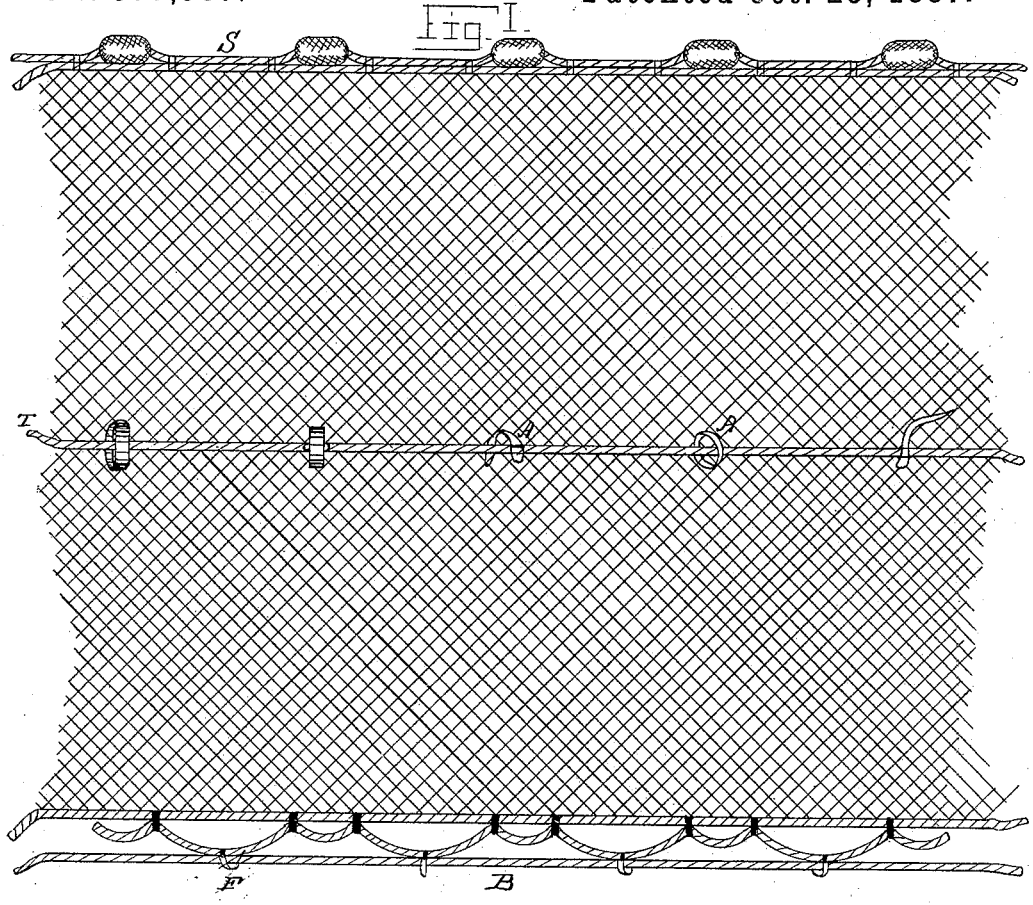
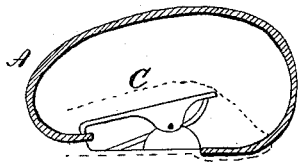
Witnesses:
Walter Allen
Percy B. Stiles
Inventor:
Ferdinand A. Sowle
By atty J. N. Kalb

UNITED STATES PATENT OFFICE.

FERDINAND A. SOWLE, OF FALL RIVER, MASSACHUSETTS.

SEINE.

SPECIFICATION forming part of Letters Patent No. 371,987, dated October 25, 1887.

Application filed June 2, 1887. Serial No. 240,106. (No model.)

*To all whom it may concern:*

Be it known that I, FERDINAND A. SOWLE, of Fall River, in the State of Massachusetts, have made certain new and useful Improvements in Seines; and I do hereby declare that the following specification, taken in connection with the drawings making a part of the same, is a full, clear, and exact description thereof.

Figure 1 is an elevation of a section of the seine. Fig. 2 shows the reefing device detached.

The object of my invention is to produce a seine which shall be capable of more effective use than those now employed; and it consists in the manner of reefing and releasing the lower portion thereof and the arrangement and operation of the tackle for that purpose, as hereinafter described.

I am aware that it is not new to gather up and secure the lower part of a seine and afterward release such portion after the seine has been set; but the devices and arrangement of tackle for that purpose heretofore in use have necessitated the taking or looping up of the pursing-line, which prevents the rapid closing of the net when required, and also renders necessary a great amount of time and labor to properly prepare and arrange the seine for setting.

In my invention I save a large share of the time and labor heretofore necessary to prepare the seine for setting, and also save time in closing it after it has been set, by avoiding all loops and slack in the pursing-line. As soon as the seine is set around a school of fish, the quick closing of the bottom is a matter of great importance, so that the escape of the fish may be prevented as much as possible.

In my invention, S is a section of a seine, through which extends a staying-line, T. To the staying-line T are attached at suitable intervals reefing-straps A, which are provided at one end with a snap or clamp, D.

B is the hauling or pursing line, which is secured to the seine at the bottom by the rings F.

The seine is prepared for "paying out" by gathering up the lower part and inclosing it with the pursing line B in the straps A, one end of which straps is passed around the gathered portion and secured in a snap or clamp, C. When the school of fish has been entirely surrounded, the men draw in on the line B, which creates a sufficient strain upon the straps to detach the ends from the clamps C and release the reef, which falls into a vertical position, as shown in Fig. 1.

The line B at all times remains straight, and is not looped or gathered up for any purpose, so that no time is lost in closing the bottom of the seine in getting in any slack, but every pull upon the pursing-line closes the seine.

The clamps C are covered with rubber, leather, or other suitable material, which prevents the net from catching in them.

In reefing and preparing the seine for setting, the time employed in other devices, where the reefs are secured by loops, is entirely saved.

If it is desired to make the seine of different widths, other reefing-straps may be attached above or below the center, as may be desired.

What I claim as my invention, and desire to secure by Letters Patent, is—

A seine having at its lower edge a pursing-line, B, and a series of reefing-straps, A, having suitable clamps for engaging their free ends, said straps extending through the middle part of the seine for gathering up, securing, and releasing the lower part thereof, when desired, without gathering up or looping said pursing-line B, the whole constructed, arranged, and operating substantially as described.

FERDINAND A. SOWLE.

Witnesses:
WALTER B. VINCENT,
CORNELIUS P. WHITE.